6792X
Parke & Brewster,
Dressing Stone.
*Patented Oct. 10, 1831.*
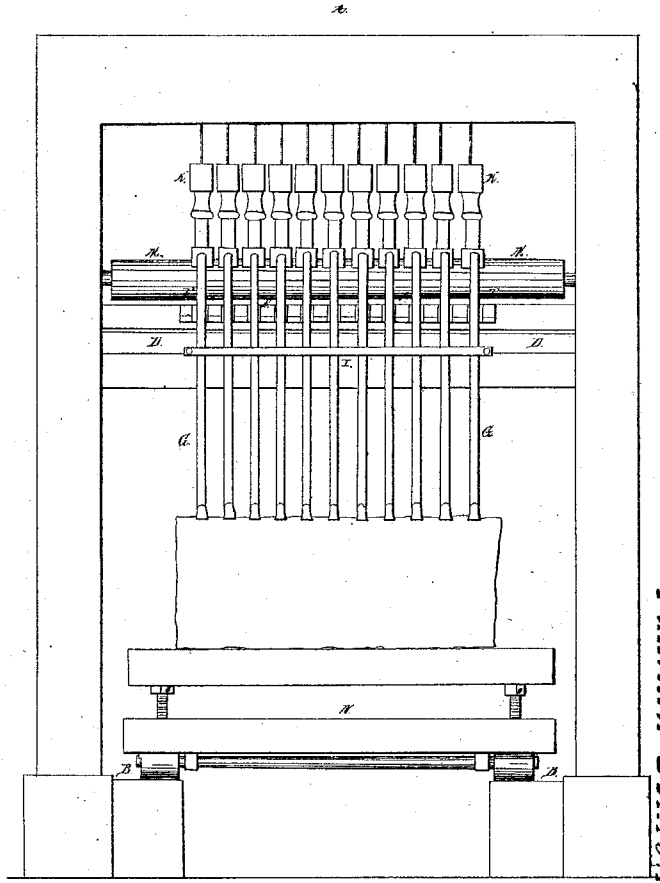
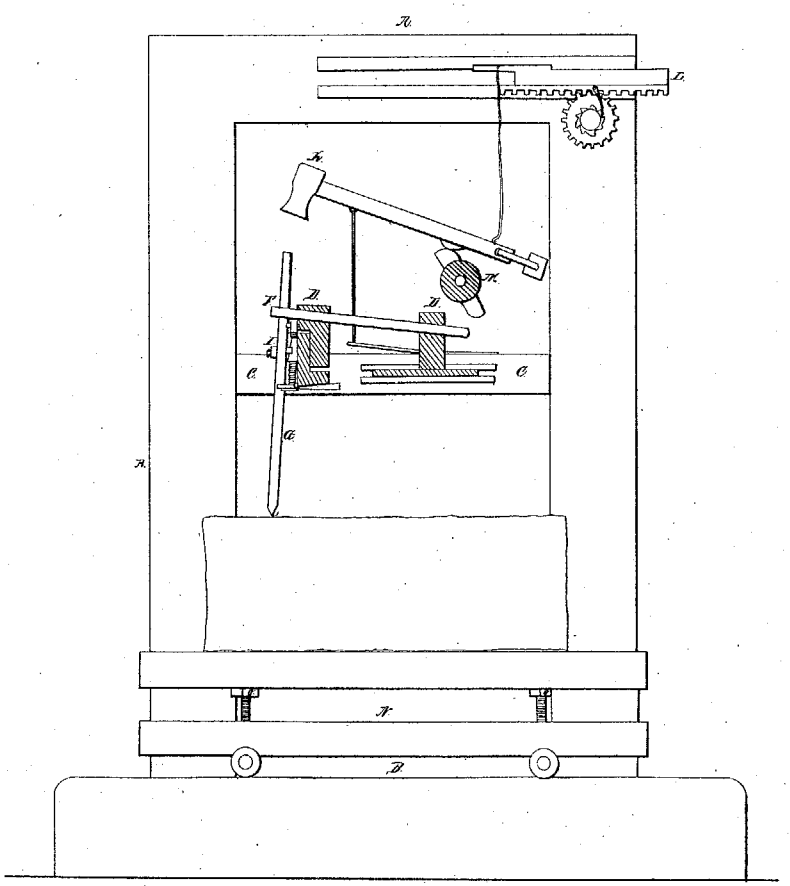
A.M. PHOTO-LITHO. CO. N.Y. (OSBORNE'S PROCESS)

Oct. 10, 1831 6792X

Lorman L. Parke Delaware N.Y. & Isaac Brewster Schoharie N.Y.

Letters Patent

The schedule referred to in these Letters Patent & making part of the same
containing a description in the words of the said Lorman L. Parke and
Isaac Brewster themselves of their improvement in the machine for cutting
and Chiselling Stone. ....

To all to whom these presents shall come. Be it
known that we Lorman L. Parke of the County of Delaware & State of
New York & Isaac Brewster of the County of Schoharie & State aforesaid
have invented a new and useful machine for Cutting & Chiselling
Stone & that the following is a full and exact description of the Construction
& operation of said Machine as invented by us.

The machine for Cutting & Chiselling stone as herein
claimed by the Subscribers consists in the first place of an upright frame
secured into two Sills or bed pieces & Constructed of suitable timber. ....

The upright posts are securely braced by cross pieces at
top and bottom & the whole firmly secured by Mortise and tenons.
At a suitable heighth from the bottom of the frame two girts are attached
to the upright posts & parallel with the Sills. Between the girts are
placed two horizontal rests the front one of which is secured by bolts or
otherwise to the girts, while the back rest is moveable horizontally by
means of slides in the sides of the girts. The front rest Consists of two pieces
parallel and joined together perpendicularly. In both Corresponding
notches are made to receive a set of Slides. These extend also through
the back rest by means of similar notches or apertures. These Slides
have space sufficient between them to admit the Chisels to fit closely.
The Chisels are made of iron or other suitable substance & are furnished
[illegible] the Slide with a lip or projection which extends out from each
side and intersects a Corresponding projection on the lower extremity of an
upright spring which is attached to the frame of the training rest. The upright
spring is so contrived that it may be moved [illegible] at pleasure by [illegible]

[illegible]

6792X of a wedge or key at the top whenever the position of the chisel is to be changed
On one side of the chisel & near the lips or projection a pin is affixed on which a
slide having a slanting surface inclining upwards is brought to bear. This
slide is secured to the front rest to prevent the chisel from rising. There is a horizontal
moveable bar which passes on the front side of the chisels and serves to keep them in their
places by means of the regulating screws. The lower part of front rest may be
moveable or passes along the backs of the upright springs & is made a little swelling
so that it may be wedged up to regulate the distance of vibration of the spring when
the chisels are forced [illegible] by the hammers. The hammers are supplied with
strings attached to the extremities of their handles which project upwards and
are secured above to the extremities of notched rods which are moveable on a hori-
zontal gate on the upper part of the machine. This gate is made to slide on
the upper part of the machine by means of a spur wheel which intersects the
notches of a rack attached to the gate. There is also attached to the gate a dog
hand which falling into the notches secures it in any place required. The hammers
are furnished with a projection opposite their heads which is intersected by a
corresponding one on a Cylinder. By turning the Cylinder the hammers are
raised till they disengage themselves when they are forced down upon the
chisels by the Springs. Through the ends of the hammer handles a bolt passes
supported by a rest or rail which moves on a pivot and thus accommodates
the hammers to the angular Change of the Chisels. The Cylinder is made
moveable to follow the projections on the hammers in their Change of position.
The Stone to be cut is placed on a Carriage Consisting of two parts, the lower part
having a set of rollers or small wheels fitted to rails on the sills on which
it is moveable. The upper part which contains the Stone may be elevated or
depressed to accommodate it to the Chisels by means of Screws or wedges.—
The Subscribers Claim the privilege of Constructing their Machine
within an upright frame sustained by sills at the bottom or of suspen-
ding the whole from timbers above. They also claim the privilege of
making the Chisels in one entire piece or of fitting them into a shaft
or handle by means of a shoulder bolt. The power required to give motion
to the machine may be either animal water or steam. [illegible]

Witnesses [illegible]
[illegible] [illegible]

[illegible]

[illegible]